US012770163B1

(12) United States Patent
Jump et al.

(10) Patent No.: US 12,770,163 B1
(45) Date of Patent: Oct. 20, 2026

(54) DIGITAL PROMOTION PROCESSING SYSTEM INCLUDING SHOPPER SELECTABLE RETAILER FOR DIGITAL PROMOTION REDEMPTION AND RELATED METHODS

(71) Applicant: Inmar Clearing, Inc., Winston-Salem, NC (US)

(72) Inventors: Andrew B. Jump, Lewisville, NC (US); Tom Fogarty, Detroit, MI (US); Kathryn Jump, Lewisville, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 276 days.

(21) Appl. No.: 18/112,029

(22) Filed: Feb. 21, 2023

Related U.S. Application Data

(63) Continuation-in-part of application No. 17/870,580, filed on Jul. 21, 2022, now Pat. No. 11,880,860.

(51) Int. Cl.
*G06Q 30/0226* (2023.01)
*G06Q 30/0238* (2023.01)

(52) U.S. Cl.
CPC ..... *G06Q 30/0238* (2013.01); *G06Q 30/0226* (2013.01)

(58) Field of Classification Search
CPC ........................................ G06Q 30/0207–0277
USPC .............................................. 705/14.1–14.73
See application file for complete search history.

(56) References Cited

U.S. PATENT DOCUMENTS 8,668,146 B1 3/2014 Mcghie et al.
8,668,148 B2 3/2014 Mcghie et al.
10,290,009 B2 * 5/2019 Thomas ............. G06Q 30/0222
10,990,999 B1 4/2021 Goforth et al.
2011/0071892 A1 3/2011 Dickelman
2012/0136706 A1 5/2012 Chang et al.

(Continued)

OTHER PUBLICATIONS

G. Chase, "How to redeem credit card points", retrieved from https://www.chase.com/personal/credit-cards/education/rewards-benefits/how-to-redeem-credit-card-points, available on Dec. 9, 2019 (Year: 2019).*

(Continued)

*Primary Examiner* — Sam Refai

(74) *Attorney, Agent, or Firm* — ALLEN, DYER, DOPPELT, + GILCHRIST, P.A. Attorneys at Law

(57) ABSTRACT

A digital promotion processing system may include a shopper device associated with a given shopper associated with respective loyalty programs at different retailers, and a promotion processing server. The server may generate a promotion identifier associated with a digital promotion. The promotion may be redeemable at the different retailers and having a redeemable value associated therewith. The server may communicate the promotion to the shopper device, cooperate with the shopper device to display the promotion, and determine a corresponding loyalty program redemption value corresponding to the redeemable value of the promotion for each of the different retailers. The server may also permit shopper-selection of one of the different retailers for redemption, and determine when the given product has been purchased by the given shopper, and when so, apply the corresponding loyalty program redemption value according to the shopper-selected one of the different retailers and based upon the promotion identifier.

8 Claims, 10 Drawing Sheets

(56) References Cited

U.S. PATENT DOCUMENTS

| | | | | |
|---|---|---|---|---|
| 2014/0108116 | A1* | 4/2014 | Quinlan | G06Q 30/02 705/14.26 |
| 2015/0088607 | A1 | 3/2015 | Georgoff et al. | |
| 2015/0100396 | A1* | 4/2015 | Boury | G06Q 30/0229 705/14.3 |
| 2015/0112790 | A1 | 4/2015 | Wolinsky et al. | |
| 2018/0075472 | A1* | 3/2018 | Antonucci | G07F 7/02 |
| 2019/0050888 | A1* | 2/2019 | Elder | G06Q 30/0227 |
| 2021/0125262 | A1 | 4/2021 | Corrieri et al. | |
| 2022/0237648 | A1 | 7/2022 | Kalwani et al. | |
| 2023/0126143 | A1* | 4/2023 | Rankin | G06Q 30/0226 705/14.33 |

OTHER PUBLICATIONS

Chase, "How to redeem credit card points", retrieved from https://www.chase.com/personal/credit-cards/education/rewards-benefits/how-to-redeem-credit-card-points, available on Dec. 9, 2019 (Year: 2019).*

Teng et al. "Examining actual consumer usage of E-wallet: A case study of big data analytics" Elsevier, Computers In Human Behavior, Oct. 2020, pp. 1-18.

Jump, Andrew; U.S. Appl. No. 17/870,580, filed Jul. 21, 2022.

* cited by examiner

DIGITAL PROMOTION PROCESSING SYSTEM INCLUDING SHOPPER SELECTABLE RETAILER FOR DIGITAL PROMOTION REDEMPTION AND RELATED METHODS

RELATED APPLICATIONS

The present application is a continuation-in-part of U.S. patent application Ser. No. 17/870,580, filed Jul. 21, 2022, the entire contents of which are hereby incorporated by reference.

TECHNICAL FIELD

The present invention relates to the field of promotion processing, and, more particularly, to processing a digital promotion based upon a selectable redemption channel.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another form of marketing or promotion may be a rebate. A rebate, like a coupon, is a form of discount applicable toward the purchase of a given product. However, unlike a coupon, a rebate is paid retrospectively.

SUMMARY

A digital promotion processing system may include a shopper device associated with a given shopper associated with respective loyalty programs at a plurality of different retailers, and a promotion processing server. The promotion processing server may be configured to generate a given promotion identifier associated with a digital promotion for a given product, the digital promotion redeemable at the plurality of different retailers and having a redeemable value associated therewith, and communicate the digital promotion to the shopper device. The promotion processing server may also be configured to cooperate with the shopper device to display, on a display of the shopper device, the digital promotion, determine a corresponding loyalty program redemption value corresponding to the redeemable value of the digital promotion for each of the plurality of different retailers, and cooperate with the shopper device to permit shopper-selection of one of the plurality of different retailers for redemption based upon display of the digital promotion. The promotion processing server may also be configured to determine when the given product has been purchased by the given shopper, and when so, apply the corresponding loyalty program redemption value according to the shopper-selected one of the plurality of different retailers and based upon the given promotion identifier.

The digital promotion may be redeemable via a plurality of different redemption channels. The redemption of the corresponding loyalty program redemption value at the shopper-selected one of the plurality of different retailers may define one of the plurality of redemption channels, for example.

The promotion processing server may be configured to cooperate with the shopper device to permit shopper-selection of one of the plurality of different redemption channels based upon display of the digital promotion. The promotion processing server may also be configured to determine when the given product has been purchased by the given shopper, and when so, apply the redeemable value according to the shopper-selected redemption channel and based upon the given promotion identifier, for example.

The corresponding loyalty program redemption value may include loyalty program points, for example. The promotion processing server may be configured to store a database of different digital promotion redeemable value-to-loyalty program redeemable value translation values, and determine the loyalty program redeemable values based upon application of the different digital promotion redeemable value-to-loyalty program redeemable value translation values to the digital promotion redeemable value.

One of the plurality of different redemption channels may include redemption at a point-of-sale (POS) terminal, for example. The promotion processing server may be configured to cooperate with the POS terminal to determine whether the given product has been purchased, and when so cooperate with the POS terminal to apply the redeemable value toward purchase of the given product at the POS terminal, for example.

One of the plurality of different redemption channels may include a future redemption. The promotion processing server may be configured to save the digital promotion in a digital wallet associated with the given shopper, and upon purchase of the given product, cooperate with the digital wallet to apply the redeemable value toward purchase of the given product, for example.

The given shopper may have a loyalty identifier for each respective loyalty program. The promotion processing server may be configured to save the digital promotion to the digital wallet associated with the given shopper based upon the loyalty identifier, for example.

One of the plurality of different redemption channels may include cashback to the given shopper. The promotion processing server may be configured to, upon purchase of the given product, cooperate to provide cashback in an amount equal to the redeemable value to the given shopper, for example.

The promotion processing server may be configured to prompt the given shopper, upon selection of the cashback redemption channel, to load the redeemable value to a payment card associated with a given retailer at which the given product has been purchased, for example. The promotion processing server may be configured to prompt the given shopper, upon selection of the cashback redemption channel, to cooperate with an online payments system to communicate the redeemable value to an account associated with the given shopper.

A method aspect is directed to a method of processing a promotion. The method may include using a promotion processing server to generate a given promotion identifier associated with a digital promotion for a given product, the digital promotion redeemable at a plurality of different retailers and having a redeemable value associated therewith, and communicate the digital promotion to a shopper device associated with a given shopper, the given shopper associated with respective loyalty programs at the plurality of different retailers. The method may also include using the promotion processing server to cooperate with the shopper device to display, on a display of the shopper device, the digital promotion, and determine a corresponding loyalty program redemption value corresponding to the redeemable value of the digital promotion for each of the plurality of different retailers. The method may further include using the promotion processing server to cooperate with the shopper device to permit shopper-selection of one of the plurality of different retailers for redemption based upon display of the digital promotion, and determine when the given product has been purchased by the given shopper, and when so, apply the corresponding loyalty program redemption value according to the shopper-selected one of the plurality of different retailers and based upon the given promotion identifier.

A computer readable medium aspect is directed to a non-transitory computer readable medium for processing a promotion. The non-transitory computer readable medium includes computer executable instructions that, when executed by a processor of a promotion processing server, cause the processor to perform operations. The operations may include generating a given promotion identifier associated with a digital promotion for a given product, the digital promotion redeemable at a plurality of different retailers and having a redeemable value associated therewith, and communicating the digital promotion to a shopper device associated with a given shopper, the given shopper associated with respective loyalty programs at the plurality of different retailers. The operation may also include cooperating with the shopper device to display, on a display of the shopper device, the digital promotion, determining a corresponding loyalty program redemption value corresponding to the redeemable value of the digital promotion for each of the plurality of different retailers, and cooperating with the shopper device to permit shopper-selection of one of the plurality of different retailers for redemption based upon display of the digital promotion. The operations may further include determining when the given product has been purchased by the given shopper, and when so, apply the corresponding loyalty program redemption value according to the shopper-selected one of the plurality of different retailers and based upon the given promotion identifier.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
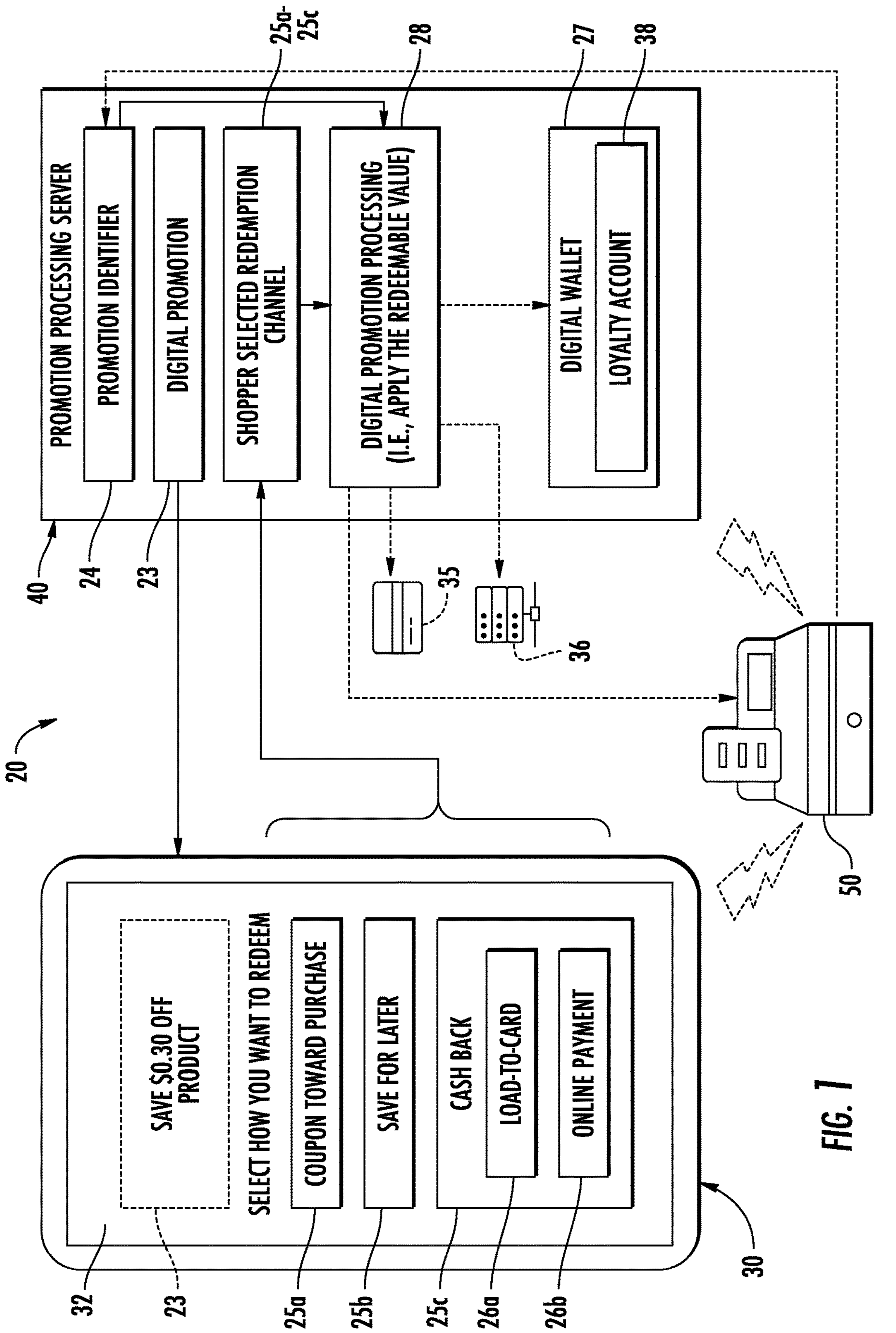
FIG. 1 is a schematic diagram of a digital promotion processing system in accordance with an embodiment.
Figure 2:
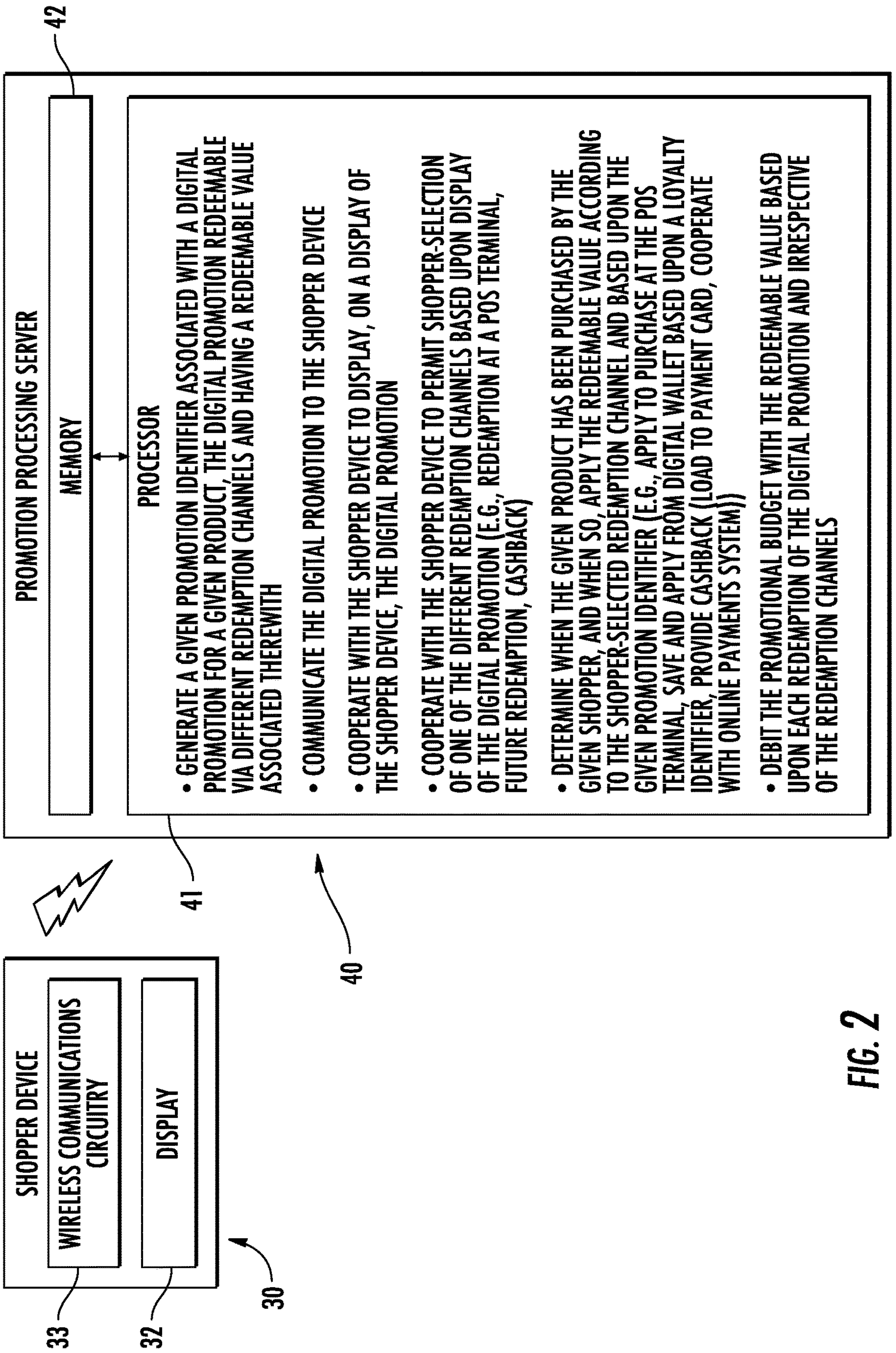
FIG. 2 is a schematic block diagram of a portion of the digital promotion processing system of FIG. 1.

Referring initially to FIGS. 1-2, a digital promotion processing system 20 includes a shopper device 30. The shopper device 30 is associated with a given shopper. The shopper device 30 is illustratively in the form of a mobile wireless communications device or smartphone and includes a display 32, wireless communications circuitry 33 (e.g., cellular, WiFi, near-field, and/or other short-range communications circuitry). While the shopper device 30 is in the form of a mobile wireless communications device, those skilled in the art will appreciate that the shopper device may be in the form of another type of device, for example, a tablet computer, personal computer, or wearable device. There may be more than one shopper device each associated with a respective shopper.

The digital promotion processing system 20 also includes a promotion processing server 40. The promotion processing server 40 includes a processor 41 and an associated memory 42. While operations of the promotion processing server 40 may be described herein, it should be appreciated that the operations are performed by way of operations between the processor 41 and the memory 42.

Figure 3:
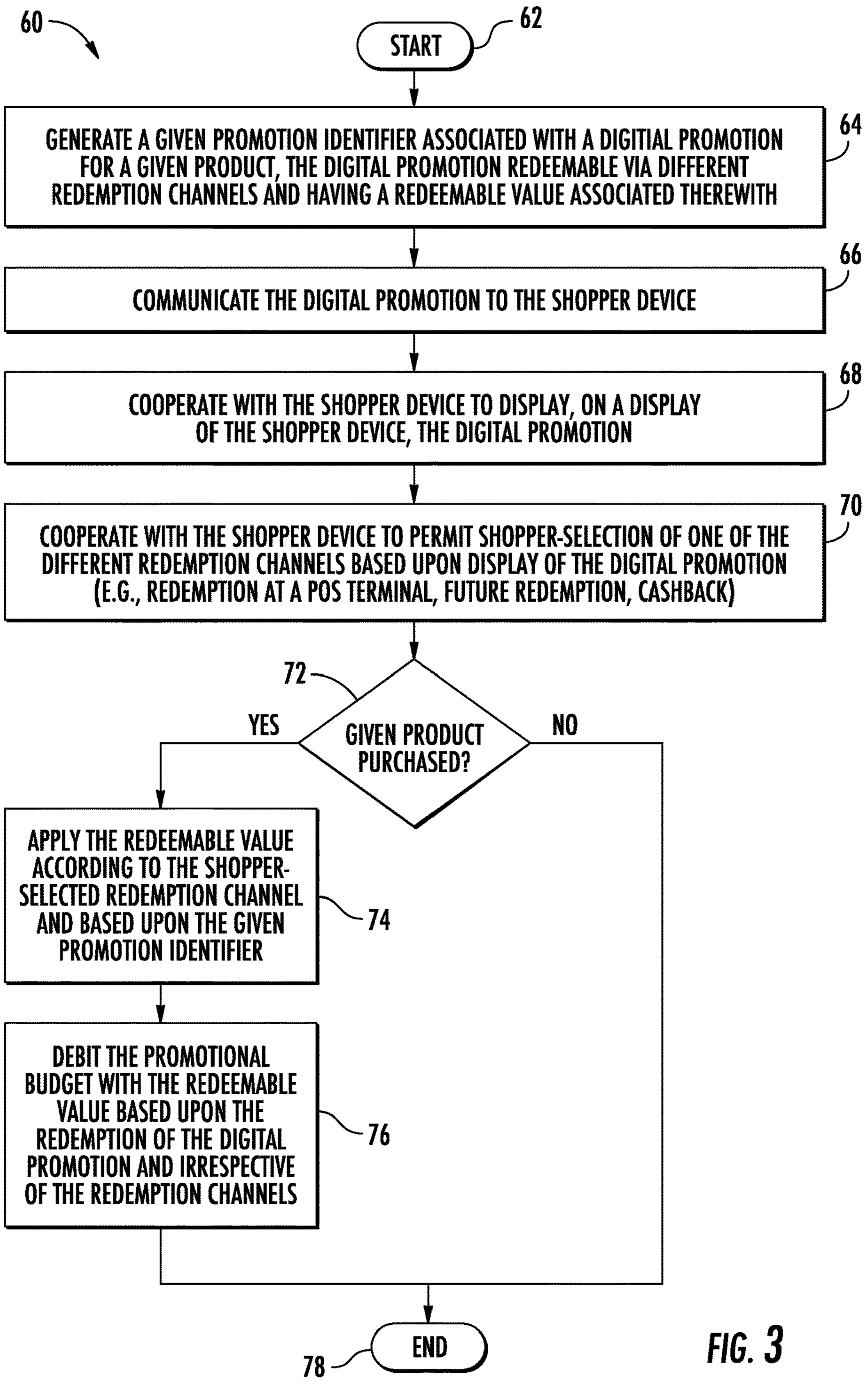
FIG. 3 is a flow chart illustrating operation of the promotion processing server of FIG. 1.

Referring now to the flowchart 60 in FIG. 3, beginning at Block 62, operations of the promotion processing server 40 will now be described. At Block 64, the promotion processing server 40 generates a given promotion identifier 24 associated with a digital promotion 23. As will be appreciated by those skilled in the art, a retailer or manufacturer may desire to run a promotional campaign that includes a digital coupon, digital rebate, and/or cash back promotion. The retailer or manufacturer may have an associated budget for the campaign, the budget of which may be debited based upon redemption of the digital promotion. Typically, when a retailer or manufacturer is desirous of having more than a single type of promotion (i.e., digital coupon, digital rebate, etc.), each type of promotion has an associated promotion identifier associated therewith.

The digital promotion 23 generated by the promotion processing server 40 is redeemable via different redemption channels 25*a*-25*c* and has a redeemable value associated therewith. In other words, the digital promotion 23 may, as one of the redemption channels 25*a*, be redeemable as a digital coupon at a point-of-sale (POS) terminal 50 whereby the redeemable value is applied to an associated product during at the conclusion of a purchase transaction at the POS terminal. The POS terminal 50 may be physically at a retailer, for example, or may be a virtual POS terminal in an online e-commerce environment.

The digital promotion 23 generated by the promotion processing server 40 may, as another one of the redemption channels 25*a*-25*c*, be a future redemption 25*b*, for example, savable to a digital wallet 27 associated with the given shopper. The digital wallet 27 may be associated with a given retailer or may be a global digital wallet, for example.

The digital promotion 23 generated by the promotion processing server 40 may, as another one of the redemption channels 25*a*-25*c*, be cashback to the given shopper 25*c*. The cashback to the given shopper may be in the form of a load-to-card promotion 26*a* or true cash back 26*b* to the given shopper, as will be described in further detail below. While several redemption channels 25*a*-25*c* are described herein, those skilled in the art will appreciate that there may be other and/or additional redemption channels.

The promotion processing server 40, at Block 66, communicates, for example, wirelessly, the digital promotion 23 to the shopper device 30. The digital promotion 23 may be communicated upon generation by the promotion processing server 40, at a desired date and time after generation, or based upon the shopper device 30 being in a geographic area for redemption, for example, at or within a retailer where the digital promotion is redeemable. The promotion processing server 40 may determine the shopper device 30 is at or within the threshold geographic area of a retailer based upon a geographic position system or receiver of the shopper device, and/or communication with one or more wireless networks.

The promotion processing server 40 cooperates with the shopper device 30 to display the digital promotion 23 on the display 32 of the shopper device (Block 68). The given shopper may provide input to the shopper device 30 to operate an application that displays the digital promotion 23. The application may be associated with a given retailer, for example.

At Block 70, the promotion processing server 40 cooperates with the shopper device 30 to permit shopper-selection of one of the different redemption channels 25*a*-25*c*. For example, the promotion processing server 40 may cooperate with the shopper device 30 to prompt the given shopper to select which of the redemption channels 25*a*-25*c* the given shopper desires. More particularly, the different available redemption channels 25*a*-25*c* for the digital promotion 23 may be displayed on the display 32 for the given shopper to select, for example, by providing input to the shopper device 30.

The promotion processing server 40, at Block 72, determines when the given product for purchase has been purchased by the given shopper. The promotion processing server 40 may determine when the given product is purchased based upon given promotion identifier 24. For example, the promotion processing server 40 may obtain product purchase information from one or more retailers along with the given promotion identifier 24, and may perform validation functions, such as determining whether the digital promotion 23 is valid or has not expired.

When, at Block 72, the given product for purchase has been purchased by the given shopper, the promotion processing server 40 applies the redeemable value according to the shopper-selected redemption channel 25*a*-25*c* and based upon the promotion identifier 24 (Block 74). More particularly, the promotion processing server 40 determines which redemption channel 25*a*-25*c* the given shopper selected and processes the digital promotion 23 for redemption 28 based thereon.

Figure 4:
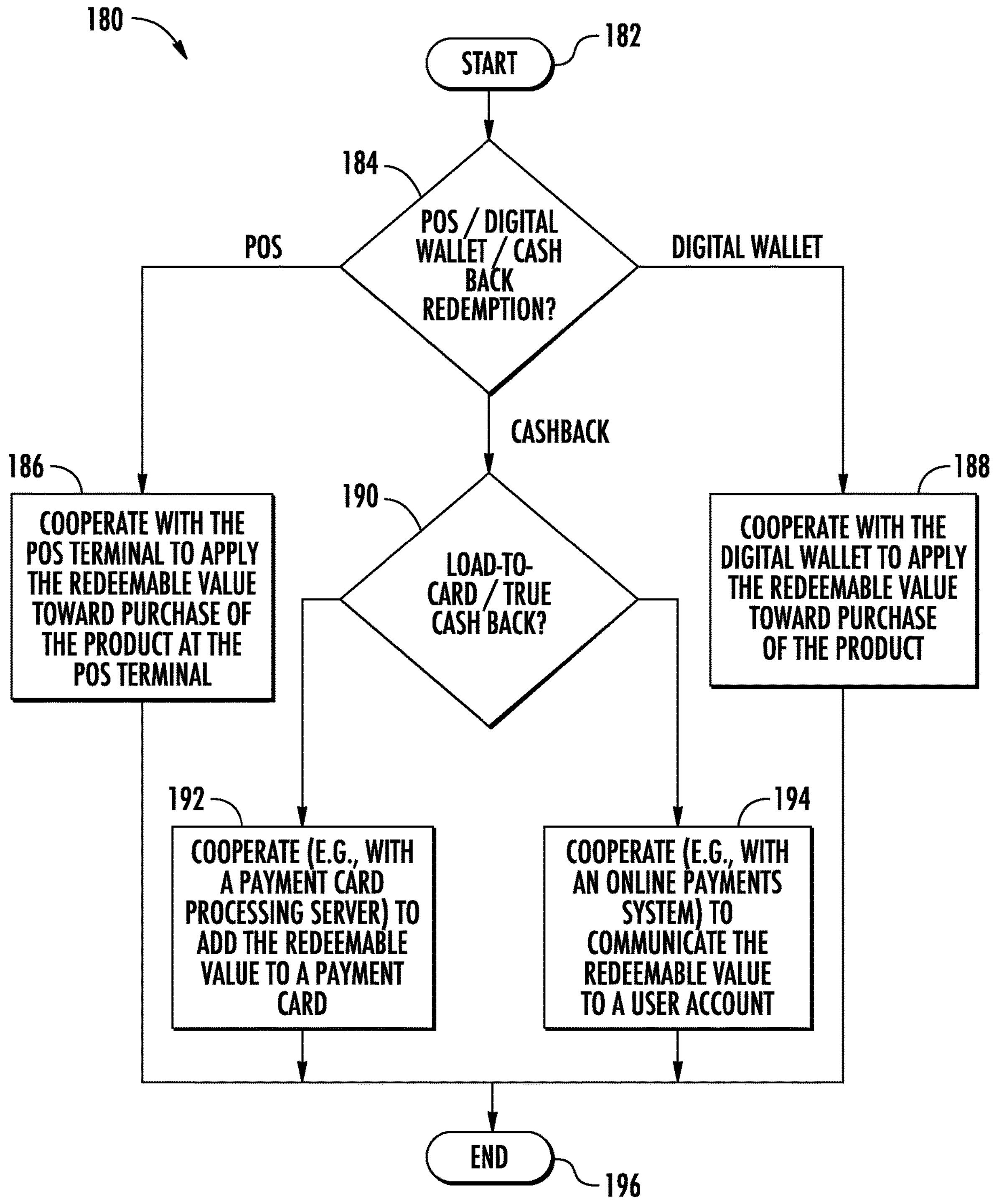
FIG. 4 is a more detailed flow chart illustrating operation of the promotion processing server of FIG. 1.

Referring now additionally to the flowchart 180 in FIG. 4, beginning at Block 182, further details of applying the digital promotion 23 will be described. At Block 184, the promotion processing server 40 determines which redemption channel 25*a*-25*c* the given shopper selected. For example, if the given shopper selects redemption at the POS terminal 50, the promotion processing server 40 cooperates with the POS terminal to apply the redeemable value toward purchase of the product at the POS terminal (Block 186). The POS terminal 50 may communicate the promotion identifier 24 to the promotion processing server 40, which may match the selected redemption channel 25*a*-25*c* to the given shopper, for example, based upon shopper identifier, such as a username, email address, phone number, shopper device identifier, and/or loyalty account identifier 38. Based upon a validation, for example, the promotion processing server 40 may cooperate with the POS terminal 50 to apply the redeemable value toward purchase of the product at the POS terminal. For example, if the digital promotion 23 is for $0.30 off the purchase of the product, the $0.30 will be applied as a discount at the POS terminal 50.

If the given shopper selected a future redemption as the shopper-selected redemption channel (Block 184), the promotion processing server 40 would have saved to the digital promotion 23 to the digital wallet 27 upon selection, for example, based upon a shopper identifier, such as a username, email address, phone number, shopper device identifier, and/or loyalty account identifier 38 associated with a given retailer. The promotion processing server 40, upon purchase of the product at Block 72, cooperates with the digital wallet 27 to apply the redeemable value toward purchase of the product (Block 188). The promotion processing server 40 may cooperate with the digital wallet 27 to obtain the promotion identifier 24, which may match the selected redemption channel 25*a*-25*c* to the given shopper, for example, based upon a shopper identifier, such as a username, email address, phone number, shopper device identifier, and/or loyalty account identifier 38. Based upon a validation, for example, the promotion processing server 40 may cooperate with the digital wallet 27 to redeem the digital promotion 23 (e.g., by removing the digital promotion from the digital wallet, and applying the redeemable value via cooperation with a POS terminal, e-commerce platform, etc.).

If the given shopper selected cashback 25*c* as the shopper-selected redemption channel 25*a*-25*c* (Block 184), the promotion processing server 40, upon purchase of the product at Block 72, cooperates to provide cashback in an amount equal to the redeemable value. More particularly, the promotion processing server 40 may prompt the given shopper, upon selection of the cashback redemption channel 25*c* to either load the redeemable value to a payment card 35 (i.e., a load-to-card promotion 26*a*) or to provide true cash back 26*b* (i.e., provide a cash payment) (Block 190).

Upon selection of the load-to-card option 26*a*, the promotion processing server 40 may load the redeemable value to a payment card that may be associated with a given retailer at which the product has been purchased, for example, similar to a gift-card for the given retailer. In other words, the promotion processing server 40 cooperates, for example, with a payment card processing server, to add funds to a payment card (Block 192). In some embodiments, the payment card 35 may not be for a given retailer and may be redeemable at any number of retailers, such as, for example, a prepaid payment card.

Upon selection of the cash payment option 26*b*, the promotion processing server 40 may cooperate with an online payments system 36 to communicate the redeemable value to an account associated with the given shopper (Block 194). The online payments system 36 may be a payments gateway, for example, the permits users to exchange funds. The redeemable value may be deposited into an account at the online payments system, may deposit the redeemable value in a bank account tied to or associated with the given shopper via the online payments system, or may deposit the redeemable value as a payment (i.e., provide a credit) for a credit account associated with the given shopper. In some embodiments, the redeemable value may be donated to a charity or charitable organization, for example, by depositing the redeemable value in an account associated with the charity and identified as being from the given shopper. Operations associated with the cashback redemption channel 25*c* end at Block 196.

As noted above, a promotional budget may be associated with the given promotion identifier 24. For example, the promotional budget may be applicable across or for multiple redemption channels 25*a*-25*c*. The promotion processing server 40 debits the promotional budget with the redeemable value based upon each redemption of the digital promotion 23 and irrespective of the redemption channels 25*a*-25*c* (Block 76). In other words, upon redemption, the given promotion identifier 24 may be passed, for example, to the promotion processing server 40 to debit the account or promotional budget. Operations end at Block 78.

A method aspect is directed to a method of processing a digital promotion 23. The method includes using a promotion processing server 40 to generate a given promotion identifier 24 associated with a digital promotion 23 for a given product. The digital promotion 23 may be redeemable via a plurality of different redemption channels 25*a*-25*c* and having a redeemable value associated therewith. The method includes using the promotion processing server 40 to communicate the digital promotion 23 to a shopper device 30 associated with a given shopper, cooperate with the shopper device to display, on a display 32 of the shopper device, the digital promotion, and cooperate with the shopper device to permit shopper-selection of one of the plurality of different redemption channels 25*a*-25*c* based upon display of the digital promotion. The method also includes using the promotion processing server 40 to determine when the given product for purchase has been purchased by the given shopper, and when so, apply the redeemable value according to the shopper-selected redemption channel 25*a*-25*c* and based upon the given promotion identifier 24.

A computer readable medium aspect is directed to a non-transitory computer readable medium for processing a digital promotion 23. The non-transitory computer readable medium includes computer executable instructions that when executed by a processor 41 cause the processor to perform operations. The operations include generating a given promotion identifier 24 associated with a digital promotion 23 for a given product. The digital promotion 23 is redeemable via a plurality of different redemption channels 25*a*-25*c* and having a redeemable value associated therewith. The operations include communicating the digital promotion 23 to a shopper device 30 associated with a given shopper, cooperating with the shopper device to display, on a display 32 of the shopper device, the digital promotion, and cooperating with the shopper device to permit shopper-selection of one of the plurality of different redemption channels 25*a*-25*c* based upon display of the digital promotion. The operations also include determining when the given product for purchase has been purchased by the given shopper, and when so, applying the redeemable value according to the shopper-selected redemption channel 25*a*-25*c* and based upon the given promotion identifier 24.

Figure 5:
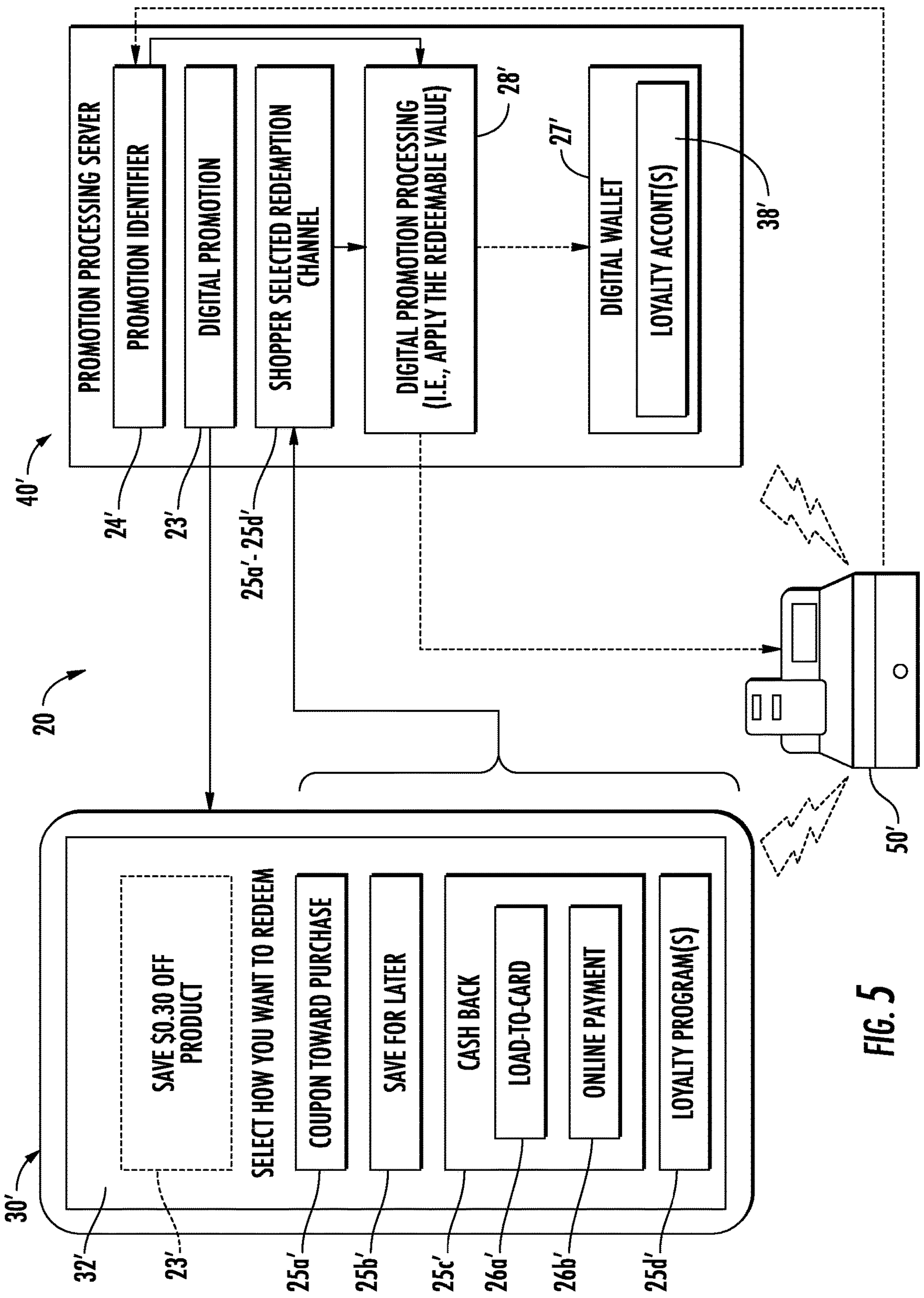
FIG. 5 is a schematic diagram of a digital promotion processing system in accordance with another embodiment.
Figure 6:
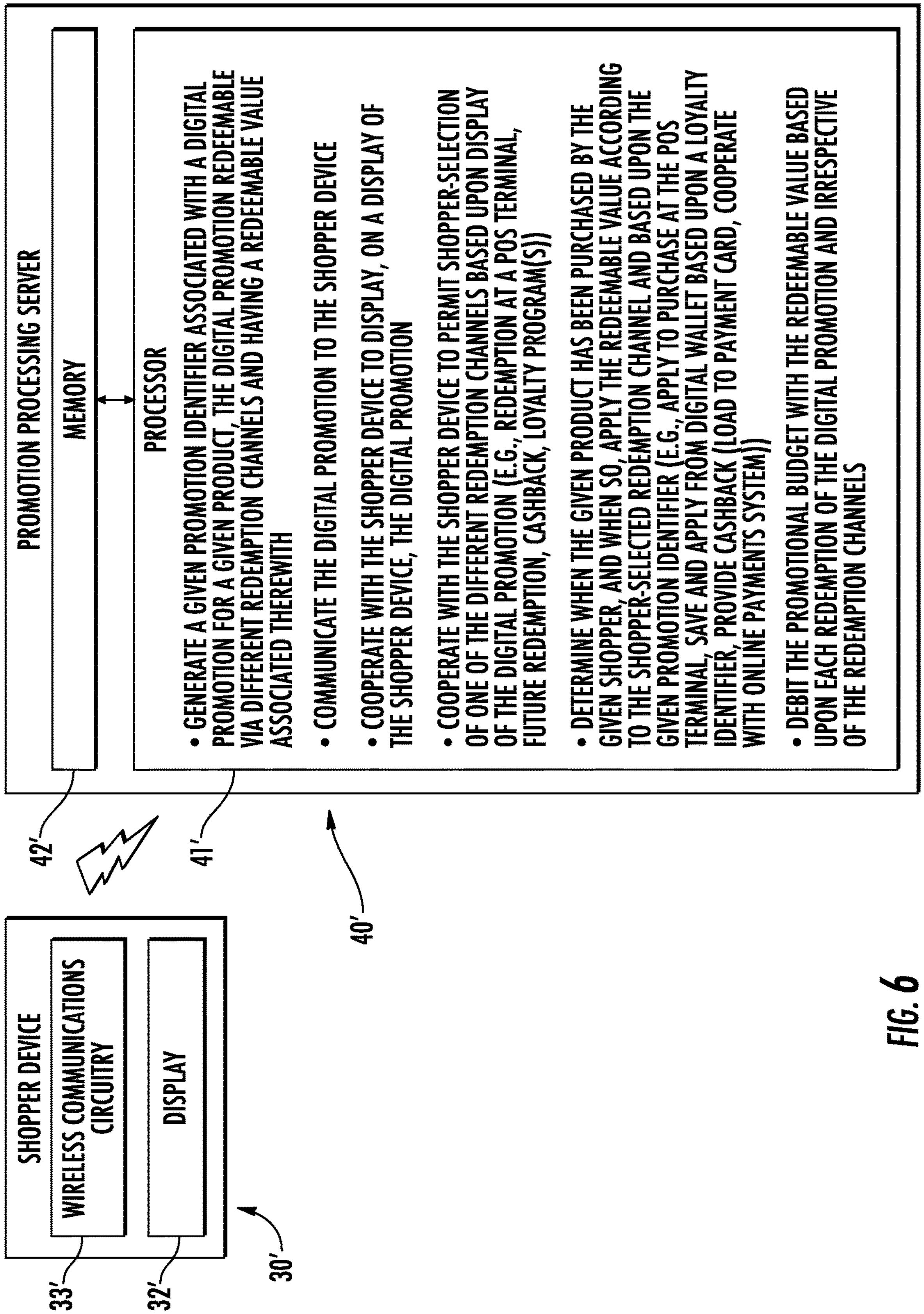
FIG. 6 is a schematic block diagram of a portion of the digital promotion processing system of FIG. 5.
Figure 7:
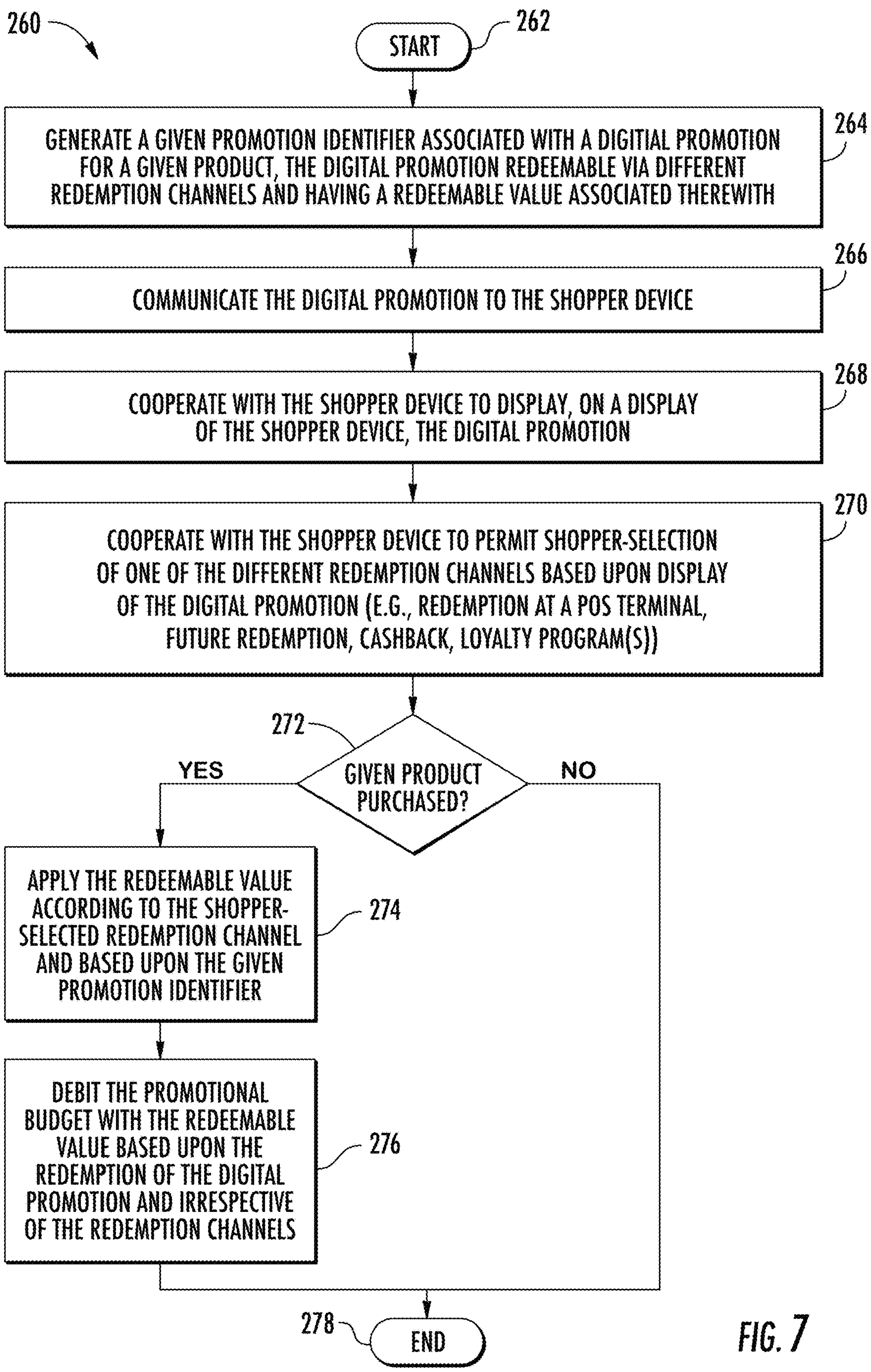
FIG. 7 is a flow chart illustrating operation of the promotion processing server of FIG. 5.

Referring now to FIGS. 5-6, and the flowchart 260 in FIG. 7, in another embodiment, the digital promotion 23' generated by the promotion processing server 40', including the processor 41' and associated memory 42', may, as another one of the redemption channels 25*a*'-25*d*', be a loyalty program redemption 25*d*' or redemption of a loyalty program redemption value at a corresponding loyalty program for an associated retailer, for example. Beginning at Block 262, operations of the promotion processing server 40' will now be described with respect to selection and redemption of the digital promotion 23' at a given retailer and with the corresponding loyalty program redemption value. Similar to the embodiments described above, at Block 264, the promotion processing server 40' generates a given promotion identifier 24' associated with a digital promotion 23'. The digital promotion 23' generated by the promotion processing server 40' is redeemable via different redemption channels 25*a*'-25*d*' and has a redeemable value associated therewith. In other words, the digital promotion 23' may, as one of the redemption channels 25*a*', be redeemable as a digital coupon at a point-of-sale (POS) terminal 50' whereby the redeemable value is applied to an associated product during at the conclusion of a purchase transaction at the POS terminal. The POS terminal 50' may be physically at a retailer, for example, or may be a virtual POS terminal in an online e-commerce environment.

The digital promotion 23' generated by the promotion processing server 40' may, as another one of the redemption channels 25*a*'-25*d*', be a future redemption 25*b*', described above and savable to a digital wallet 27' associated with the given shopper and corresponding loyalty account 38', or be cashback to the given shopper 25*c*'. The cashback to the given shopper may be in the form of a load-to-card promotion 26*a*' or true cash back 26*b*' to the given shopper, as described above. The digital promotion 23' generated by the promotion processing server 40' may, as another one of the redemption channels 25*a*'-25*d*', be loyalty program redemption 25*d*', as will be described in further detail below.

The promotion processing server 40', at Block 266, communicates, for example, wirelessly, the digital promotion 23' to the shopper device 30'. The digital promotion 23' may be communicated as described in the above embodiments. The promotion processing server 40' cooperates with the shopper device 30' to display the digital promotion 23' on the display 32' of the shopper device (Block 268). The shopper device 30' similar to the shopper device described above, may be in the form of a mobile wireless communications device or smartphone, and may include wireless communications circuitry 33'. The given shopper may provide input to the shopper device 30' to operate an application that displays the digital promotion 23'. The application may be associated with a given retailer, for example.

At Block 270, the promotion processing server 40' cooperates with the shopper device 30' to permit shopper-selection of one of the different redemption channels 25*a*-25*d*'. For example, the promotion processing server 40' may cooperate with the shopper device 30' to prompt the given shopper to select which of the redemption channels 25*a*'-25*d*' the given shopper desires.

The promotion processing server 40', at Block 272, determines when the given product for purchase has been purchased by the given shopper. The promotion processing server 40' may determine when the given product is purchased based upon given promotion identifier 24'. For example, the promotion processing server 40' may obtain product purchase information from one or more retailers along with the given promotion identifier 24', and may perform validation functions, such as determining whether the digital promotion 23' is valid or has not expired.

When, at Block 272, the given product for purchase has been purchased by the given shopper, the promotion processing server 40' applies the redeemable value according to the shopper-selected redemption channel 25*a'*-25*d'* and based upon the promotion identifier 24' (Block 274). More particularly, the promotion processing server 40' determines which redemption channel 25*a'*-25*d'* the given shopper selected and processes the digital promotion 23' for redemption 28' based thereon. The promotional budget may be debited at Block 276, as described above. Operations end at Block 278.

Figure 8:
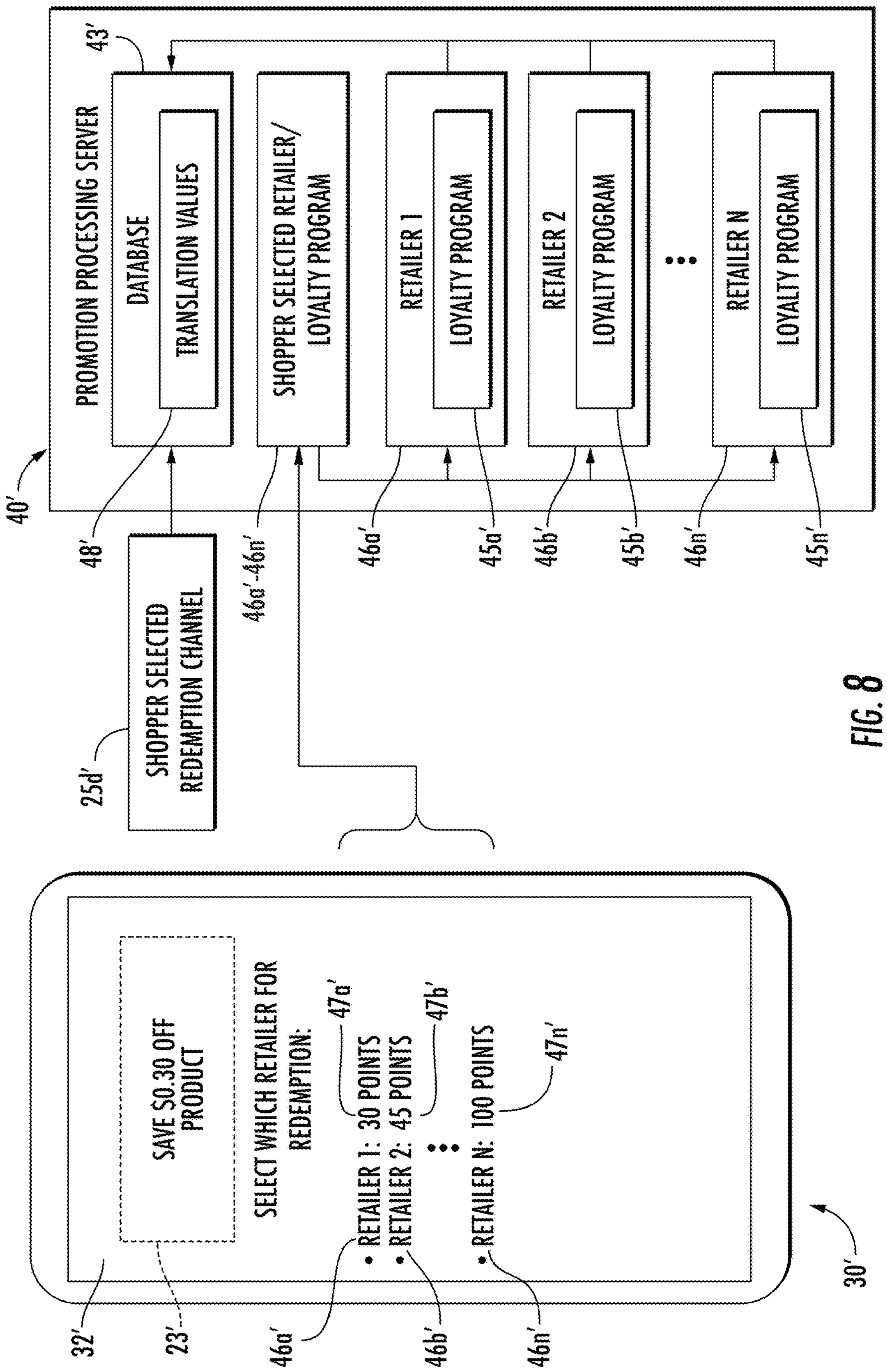
FIG. 8 is another schematic diagram of the digital promotion processing system in accordance with the embodiment of FIG. 5.
Figure 9:
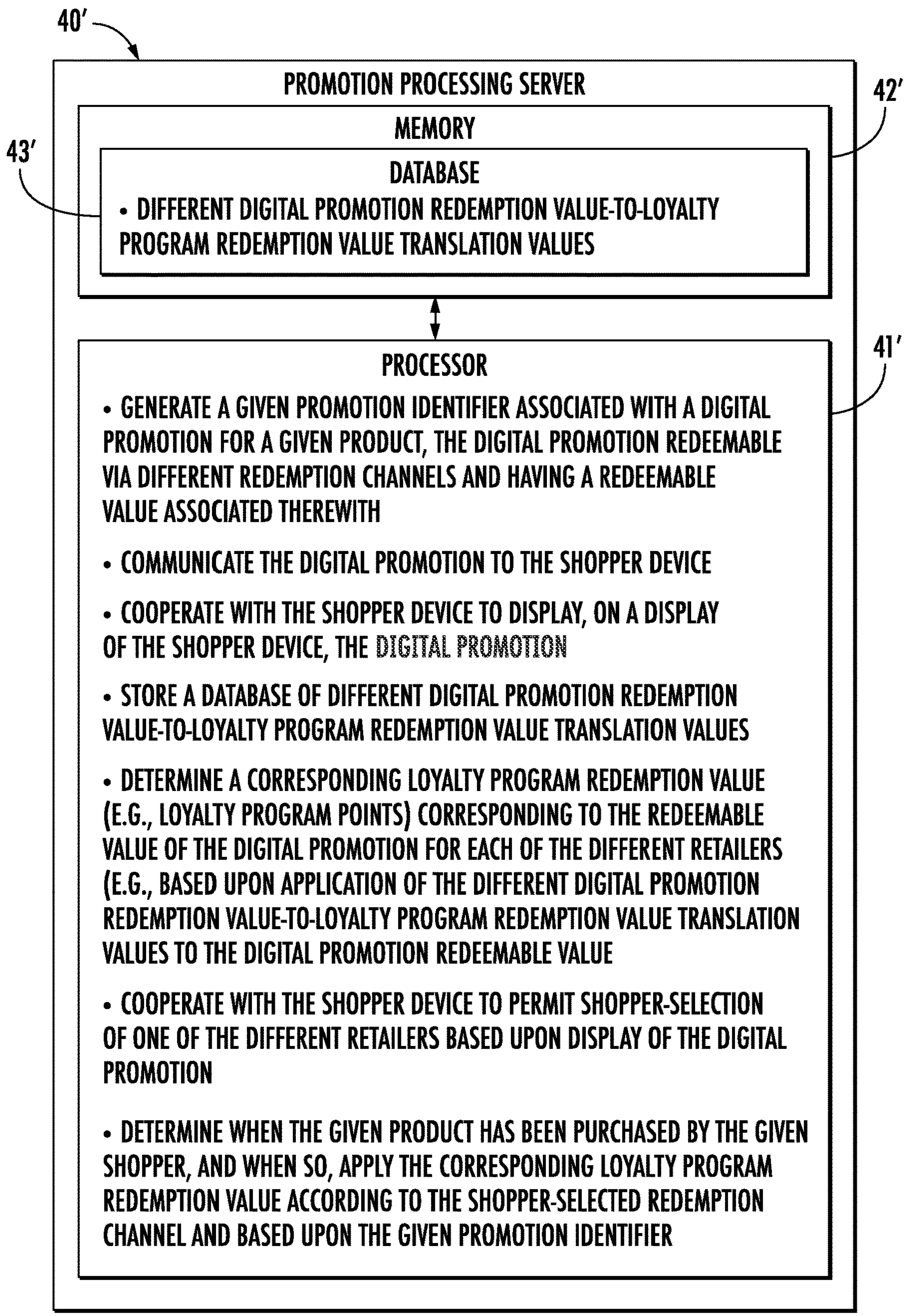
FIG. 9 is another schematic block diagram of a portion of the digital promotion processing system of FIG. 8.
Figure 10:
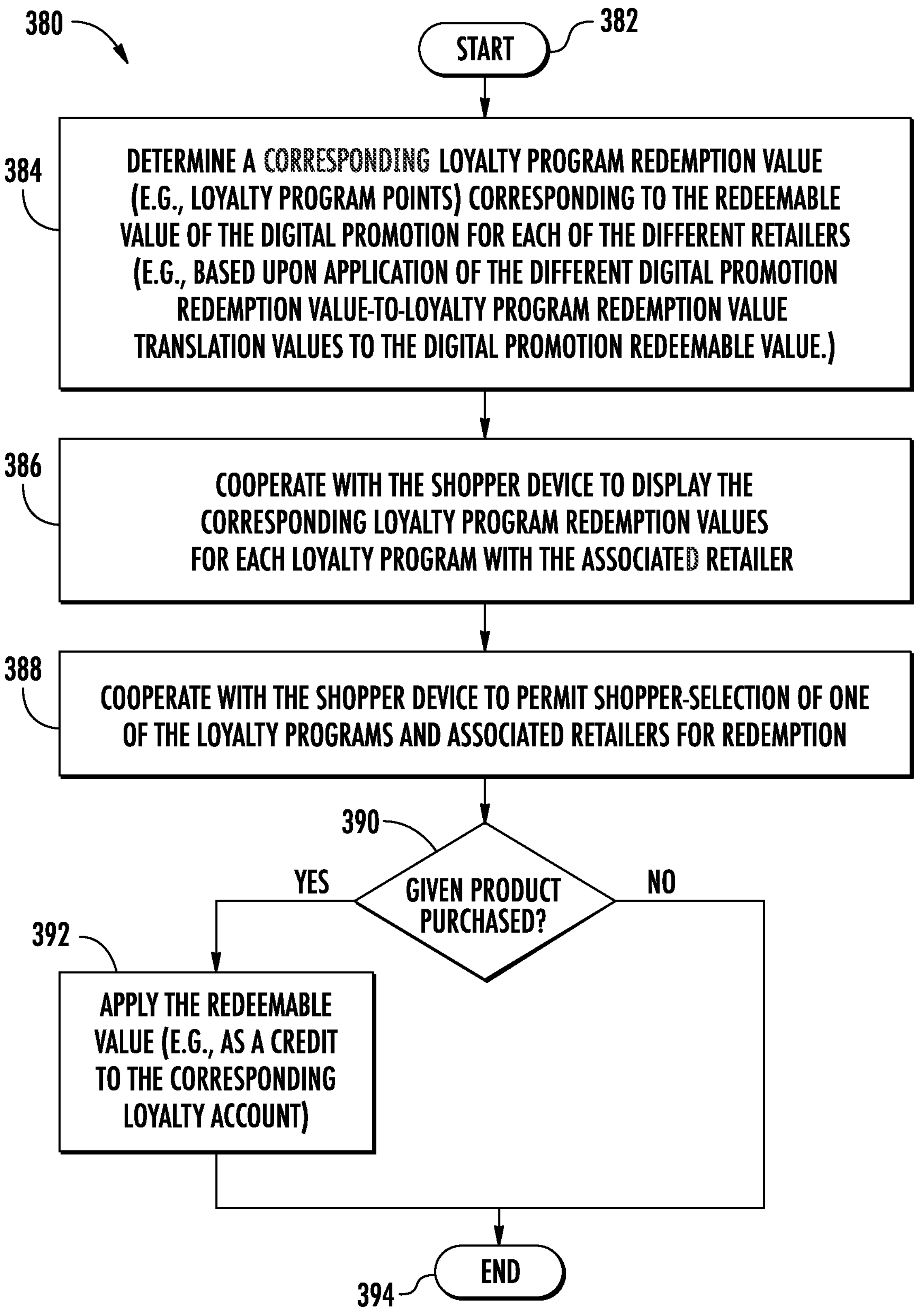
FIG. 10 is a flow chart illustrating more detailed operations of the promotion processing server of FIG. 5.

Referring now additionally to FIGS. 8-9, and the flowchart 380 in FIG. 10, beginning at Block 382, further details of applying the digital promotion 23' when the loyalty program redemption channel 25*d'* has been selected by the user will be described. The given shopper is associated with different loyalty programs 45*a'*-45*n'*, for example, having different loyalty accounts. The different loyalty programs 45*a'*-45*n'* are associated with or operated by corresponding different retailers 46*a'*-46*n'*.

At Block 384, the promotion processing server 40' determines a corresponding loyalty program redemption value 47*a'*-47*n'* corresponding to the redeemable value of the digital promotion 23'. As will be appreciated by those skilled in the art, a given dollar amount of redeemable value of the digital promotion 23' may not correspond to the same dollar amount, or other currency, such as, for example, loyalty points, in each of the different loyalty program 45*a'*-45*n'*. For example, a dollar of redeemable value of the digital promotion 23' may correspond to ninety cents at a first retailer, seventy-five cents at a second retailer, and so on. Where the loyalty program redemption value 47*a'*-47*n'*, for example, is loyalty points, a dollar of redeemable value of the digital promotion 23' may correspond to 10 points at a first retailer, 50 at a second retailer, and so on.

The promotion processing server 40' determines or translates the redeemable value of the digital promotion 23' to the corresponding loyalty program redemption value 47*a'*-47*n'*. More particularly, the promotion processing server 40' may store, in the memory 42',a database 43' of different digital promotion redeemable value-to-loyalty program redeemable value translation values 48'. The database 43' may conceptually be considered a lookup table of the values indexed by retailer. The translation values 48' may be static and/or may be set by each corresponding retailer. The translation values 48' may be dynamic in that the promotion processing server 40' may adjust the translation values based upon any number of factors, for example, redeemable value of the digital promotion 23' (e.g., so that a higher value digital promotion may have a lesser translation value resulting in less loyalty value than a lower value digital promotion and vice versa), actual redemption rates (e.g., so that a higher redemption rate may correspond to lower loyalty value and vice versa), and selection of loyalty account as a redemption channel relative to selection of other redemption channels 25*a'*-25*c'* (e.g., so that a lower selection rate of the loyalty account redemption channel 25*d'* may result in a higher translation value resulting in a higher loyalty value and vice versa). In some embodiments, the promotion processing server 40' may apply a machine learning algorithm that may accept as input any one or more of the translation values factors and/or static (e.g., retailer provided), translation values. The machine learning algorithm may generate, as an output, the corresponding translation value, which may be updated with each iteration of the algorithm such that the output changes with each iteration thus affecting the operation thereof (i.e. affects a transformation of the promotion processing server).

At Block 386, the promotion processing server 40' may cooperate with the shopper device 30' to display the corresponding loyalty program redemption values 47*a'*-47*n'* for each loyalty program 45*a'*-45*n'* or retailer 46*a'*-46*n'*. The promotion processing server 40' cooperates with the shopper device 30', at Block 388, to permit shopper-selection of one of the different retailers 46*a'*-46*n'* for redemption. Once the given shopper selects a loyalty program 45*a'*-45*n'* and associated retailer 46*a'*-46*n'* (Block 388), the promotion processing server 40' determines whether the given product has been purchased (Block 390), and when so, applies the corresponding loyalty program redemption value (Block 392), for example, as described above. The corresponding loyalty program redemption value 47*a'*-47*n'* may be credited to the loyalty account 38' (FIG. 5) or to the loyalty program 45*a'*-45*n'* associated with the given shopper at the corresponding retailer 46*a'*-46*n'*. Operations end at Block 394.

A method aspect is directed to a method of processing a promotion. The method includes using a promotion processing server 40' to generate a given promotion identifier 24' associated with a digital promotion 23' for a given product, the digital promotion redeemable at a plurality of different retailers 46*a'*-46*n* and having a redeemable value associated therewith, and communicate the digital promotion to a shopper device 30' associated with a given shopper, the given shopper associated with respective loyalty programs 45*a'*-45*n'* at the plurality of different retailers. The method also includes using the promotion processing server 40' to cooperate with the shopper device 30' to display, on a display 32' of the shopper device, the digital promotion 23', and determine a corresponding loyalty program redemption value 47*a'*-47*n'* corresponding to the redeemable value of the digital promotion for each of the plurality of different retailers 46*a'*-46*n'*. The method further includes using the promotion processing server 40' to cooperate with the shopper device 30' to permit shopper-selection of one of the plurality of different retailers 46*a'*-46*n'* for redemption based upon display of the digital promotion 23', and determine when the given product has been purchased by the given shopper, and when so, apply the corresponding loyalty program redemption value 47*a'*-47*n'* according to the shopper-selected one of the plurality of different retailers and based upon the given promotion identifier 24'.

A computer readable medium aspect is directed to a non-transitory computer readable medium for processing a promotion. The non-transitory computer readable medium includes computer executable instructions that, when executed by a processor 41' of a promotion processing server 40', cause the processor to perform operations. The operations include generating a given promotion identifier 24' associated with a digital promotion 23' for a given product, the digital promotion redeemable at a plurality of different retailers 46*a'*-46*n'* and having a redeemable value associated therewith, and communicating the digital promotion to a shopper device 30' associated with a given shopper, the given shopper associated with respective loyalty programs 45*a'*-45*n'* at the plurality of different retailers. The operation also includes cooperating with the shopper device 30' to display, on a display 32' of the shopper device, the digital promotion 23', determining a corresponding loyalty program redemption value 47*a'*-47*n'* corresponding to the redeemable value of the digital promotion for each of the plurality of different retailers 46*a'*-46*n'*, and cooperating with the shopper device to permit shopper-selection of one of the plurality of different retailers for redemption based upon display of the digital promotion. The operations further include determining when the given product has been purchased by the given shopper, and when so, apply the corresponding loyalty program redemption value 47*a*'-47*n*' according to the shopper-selected one of the plurality of different retailers 46*a*'-46*n*' and based upon the given promotion identifier 24'.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:

a shopper device associated with a given shopper associated with respective loyalty programs at a plurality of different retailers; and a promotion processing server configured to generate a given promotion identifier associated with a digital promotion for a given product, the digital promotion redeemable via a plurality of different redemption channels comprising at a point-of-sale (POS) device, a future redemption, cashback to the given shopper, and loyalty program, the loyalty program redemption channel permitting the digital promotion to be redeemable at the plurality of different retailers via the associated loyalty programs, and the digital promotion having a redeemable value associated therewith, communicate the digital promotion to the shopper device, communicate with the shopper device to cause the shopper device to generate, on a display of the shopper device a user interface including the digital promotion and a plurality of different shopper-selectable inputs representing the plurality of different redemption channels, cooperate with the shopper device to permit shopper-selection, via the user interface, of one of the plurality of different shopper-selectable inputs representing a corresponding one of the plurality of different redemption channels based upon display of the digital promotion on the display, communicate with the shopper device to obtain the shopper selection of the one of the different shopper-selectable inputs to the user interface, cooperate to save the digital promotion to a digital wallet associated with the given shopper upon obtaining the shopper-selected one of the different shopper-selectable inputs to the user interface corresponding to the future redemption, cooperate with the shopper device to cause the shopper device to, upon obtaining the shopper-selected one of the different shopper-selectable inputs to the user interface corresponding to the loyalty program generate, on a display of the shopper device, a user interface including the digital promotion and a plurality of different shopper-selectable inputs representing the plurality of different retailers, store a plurality of different digital promotion redeemable value-to-loyalty program redeemable value translation values each corresponding to a respective retailer, determine a redemption rate associated with the digital promotion, adjust the translation values based upon the redemption rate and the redeemable value of the digital promotion, determine a corresponding loyalty program redemption value based upon the corresponding translation values for each of the plurality of different retailers, cooperate with the shopper device to cause the shopper device to generate, within the user interface on the display of the shopper device, the loyalty program redemption values adjacent corresponding ones of the plurality of different shopper-selectable inputs representing the plurality of different retailers, cooperate with the shopper device to permit shopper-selection, via the user interface, of one of the plurality of different retailers for redemption based upon display of the digital promotion on the display, and communicate with the shopper device to obtain the shopper-selection of the one of the plurality of different shopper-selectable inputs to the user interface corresponding to the one of the plurality of different retailers for redemption, and determine when the given product has been purchased by the given shopper, and when so, apply the redeemable value according to the shopper-selected redemption channel and based upon the promotion identifier by at least crediting the loyalty program associated with the corresponding loyalty program redemption value according to the shopper-selected one of the plurality of different retailers upon obtaining the shopper-selected one of the different shopper-selectable inputs to the user interface corresponding to the loyalty program, cooperating with the POS device to apply the redeemable value toward purchase of the given product at the POS device upon obtaining the shopper selection of the one of the different shopper-selectable inputs to the user interface corresponding to redemption at the POS device, cooperating with the digital wallet to apply the redeemable value toward purchase of the given product upon obtaining the shopper selection of the one of the different shopper-selectable inputs to the user interface corresponding to the future redemption, and cooperating with a payments system to provide a payment to the given shopper in an amount equal to the redeemable value upon obtaining shopper selection of one of the different shopper selectable inputs displayed via the user interface corresponding to cashback.

2. The digital promotion processing system of claim 1 wherein the corresponding loyalty program redemption value comprises loyalty program points.

3. The digital promotion processing system of claim 1 wherein the given shopper has a loyalty identifier for each respective loyalty program; and wherein the promotion processing server is configured to save the digital promotion to the digital wallet associated with the given shopper based upon the loyalty identifier.

4. The digital promotion processing system of claim 1 wherein the promotion processing server is configured to prompt the given shopper, upon selection of the cashback redemption channel, to load the redeemable value to a payment card associated with a given retailer at which the given product has been purchased.

5. The digital promotion processing system of claim 1 wherein the promotion processing server is configured to prompt the given shopper, upon selection of the cashback redemption channel, to cooperate with an online payments system to communicate the redeemable value to an account associated with the given shopper.

6. A promotion processing server comprising:

a processor and an associated memory configured to generate a given promotion identifier associated with a digital promotion for a given product, the digital promotion redeemable via a plurality of different redemption channels comprising at a point-of-sale (POS) device, a future redemption, cashback to the given shopper, and loyalty program, the loyalty program redemption channel permitting the digital promotion to be redeemable at a plurality of different retailers via associated respective loyalty programs, and the digital promotion having a redeemable value associated therewith, communicate the digital promotion to a shopper device associated with a given shopper, the given shopper associated with the respective loyalty programs at the plurality of different retailers, communicate with the shopper device to cause the shopper device to generate, on a display of the shopper device a user interface including the digital promotion and a plurality of different shopper-selectable inputs representing the plurality of different redemption channels, cooperate with the shopper device to permit shopper-selection, via the user interface, of one of the plurality of different shopper-selectable inputs representing a corresponding one of the plurality of different redemption channels based upon display of the digital promotion on the display, communicate with the shopper device to obtain the shopper selection of the one of the different shopper-selectable inputs to the user interface, cooperate to save the digital promotion to a digital wallet associated with the given shopper upon obtaining the shopper-selected one of the different shopper-selectable inputs to the user interface corresponding to the future redemption, cooperate with the shopper device to cause the shopper device to, upon obtaining the shopper-selected one of the different shopper-selectable inputs to the user interface corresponding to the loyalty program generate, on a display of the shopper device, a user interface including the digital promotion and a plurality of different-selectable inputs representing the plurality of different retailers, store a plurality of different digital promotion redeemable value-to-loyalty program redeemable value translation values each corresponding to a respective retailer, determine a redemption rate associated with the digital promotion, adjust the translation values based upon the redemption rate and the redeemable value of the digital promotion, determine a corresponding loyalty program redemption value based upon the corresponding translation values for each of the plurality of different retailers, cooperate with the shopper device to cause the shopper device to generate, within the user interface on the display of the shopper device, the loyalty program redemption values adjacent corresponding ones of the plurality of different shopper-selectable inputs representing the plurality of different retailers, cooperate with the shopper device to permit shopper-selection, via the user interface, of one of the plurality of different retailers for redemption based upon display of the digital promotion on the display, and communicate with the shopper device to obtain the shopper-selection of the one of the plurality of different shopper-selectable inputs to the user interface corresponding to the one of the plurality of different retailers for redemption, and determine when the given product has been purchased by the given shopper, and when so, apply the redeemable value according to the shopper-selected redemption channel and based upon the promotion identifier by at least crediting the loyalty program associated with the corresponding loyalty program redemption value according to the shopper-selected one of the plurality of different retailers, cooperating with the POS device to apply the redeemable value toward purchase of the given product at the POS device upon obtaining the shopper selection of the one of the different shopper-selectable inputs to the user interface corresponding to redemption at the POS device, cooperating with the digital wallet to apply the redeemable value toward purchase of the given product upon obtaining the shopper selection of the one of the different shopper-selectable inputs to the user interface corresponding to the future redemption, and cooperating with a payments system to provide a payment to the given shopper in an amount equal to the redeemable value upon obtaining shopper selection of one of the different shopper selectable inputs displayed via the user interface corresponding to cashback.

7. The promotion processing server of claim 6 wherein the corresponding loyalty program redemption value comprises loyalty program points.

8. A non-transitory computer readable medium for processing a promotion, the non-transitory computer readable medium comprising computer executable instructions that, when executed by a processor of a promotion processing server, cause the processor to perform operations comprising:

generating a given promotion identifier associated with a digital promotion for a given product, the digital promotion redeemable via a plurality of different redemption channels comprising at a point-of-sale (POS) device, a future redemption, cashback to the given shopper, and loyalty program, the loyalty program redemption channel permitting the digital promotion to be redeemable at a plurality of different retailers via associated loyalty programs, and the digital promotion having a redeemable value associated therewith;

communicating the digital promotion to a shopper device associated with a given shopper, the given shopper associated with the respective loyalty programs at the plurality of different retailers;

communicating with the shopper device to cause the shopper device to generate, on a display of the shopper device a user interface including the digital promotion and a plurality of different shopper-selectable inputs representing the plurality of different redemption channels;

cooperating with the shopper device to permit shopper-selection, via the user interface, of one of the plurality of different shopper-selectable inputs representing a corresponding one of the plurality of different redemption channels based upon display of the digital promotion on the display;

communicating with the shopper device to obtain the shopper selection of the one of the different shopper-selectable inputs to the user interface;

cooperating to save the digital promotion to a digital wallet associated with the given shopper upon obtaining the shopper-selected one of the different shopper-selectable inputs to the user interface corresponding to the future redemption;

cooperating with the shopper device to cause the shopper device to, upon obtaining the shopper-selected one of the different shopper-selectable inputs to the user interface corresponding to the loyalty program generate, on a display of the shopper device, a user interface including the digital promotion and a plurality of different shopper-selectable inputs representing the plurality of different retailers, store a plurality of different digital promotion redeemable value-to-loyalty program redeemable value translation values each corresponding to a respective retailer, determine a redemption rate associated with the digital promotion, adjust the translation values based upon the redemption rate and the redeemable value of the digital promotion, determine a corresponding loyalty program redemption value based upon the corresponding translation values for each of the plurality of different retailers, cooperate with the shopper device to cause the shopper device to generate, within the user interface on the display of the shopper device, the loyalty program redemption values adjacent corresponding ones of the plurality of different shopper-selectable inputs representing the plurality of different retailers, cooperate with the shopper device to permit shopper-selection, via the user interface, of one of the plurality of different retailers for redemption based upon display of the digital promotion on the display, communicate with the shopper device to obtain the shopper-selection of the one of the plurality of different shopper-selectable inputs to the user interface corresponding to the one of the plurality of different retailers for redemption; and determining when the given product has been purchased by the given shopper, and when so, apply the redeemable value according to the shopper-selected redemption channel and based upon the promotion identifier by at least crediting the loyalty program associated with the corresponding loyalty program redemption value according to the shopper-selected one of the plurality of different retailers upon obtaining the shopper-selected one of the different shopper-selectable inputs to the user interface corresponding to the loyalty program, cooperating with the POS device to apply the redeemable value toward purchase of the given product at the POS device upon obtaining the shopper selection of the one of the different shopper-selectable inputs to the user interface corresponding to redemption at the POS device, cooperating with the digital wallet to apply the redeemable value toward purchase of the given product upon obtaining the shopper selection of the one of the different shopper-selectable inputs to the user interface corresponding to the future redemption, and cooperating with a payments system to provide a payment to the given shopper in an amount equal to the redeemable value upon obtaining shopper selection of one of the different shopper selectable inputs displayed via the user interface corresponding to cashback.

* * * * *